(12) United States Patent
Hayes et al.

(10) Patent No.: US 11,994,403 B2
(45) Date of Patent: May 28, 2024

(54) SYSTEMS AND METHODS OF CONNECTED DRIVING BASED ON DYNAMIC CONTEXTUAL FACTORS

(71) Applicant: Allstate Insurance Company, Northbrook, IL (US)

(72) Inventors: Howard Hayes, Glencoe, IL (US); Sunil Chintakindi, Menlo Park, CA (US); Tim Gibson, Barrington, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

(21) Appl. No.: 17/980,778

(22) Filed: Nov. 4, 2022

(65) Prior Publication Data

US 2023/0082390 A1 Mar. 16, 2023

Related U.S. Application Data

(63) Continuation of application No. 17/009,228, filed on Sep. 1, 2020, now Pat. No. 11,493,351.
(Continued)

(51) Int. Cl.
*G01C 21/34* (2006.01)
*B60W 30/095* (2012.01)
(Continued)

(52) U.S. Cl.
CPC ..... *G01C 21/3461* (2013.01); *B60W 30/0953* (2013.01); *B60W 40/04* (2013.01);
(Continued)

(58) Field of Classification Search
CPC ............ G01C 21/3461; G01C 21/3626; G01C 21/3691; G01C 21/3807; G01C 21/3833; G01C 21/3822; B60W 30/0953; B60W 40/04; B60W 40/06; B60W 40/08; B60W 40/105; B60W 40/107; B60W 2420/42; B60W 2510/18; B60W 2510/20; B60W 2540/229; B60W 50/14; B60W 2556/45
See application file for complete search history.

(56) References Cited

U.S. PATENT DOCUMENTS 9,573,592 B2 2/2017 Prokhorov et al.
9,919,648 B1 3/2018 Pedersen
(Continued)

OTHER PUBLICATIONS

International Search Report and Written Opinion for International Application No. PCT/US2020/049029, dated Dec. 3, 2020, 10 Pages.
(Continued)

*Primary Examiner* — Alan D Hutchinson
(74) *Attorney, Agent, or Firm* — Polsinelli PC

(57) ABSTRACT

Systems including one or more sensors, coupled to a vehicle, may detect sensor information and provide the sensor information to another computing device for processing. A system includes one or more sensors, coupled to a vehicle and configured to detect sensor information, and a computing device configured to communicate with one or more mobile sensors to receive the mobile sensor information, communicate with the one or more sensors to receive the sensor information, and analyze the sensor information and the mobile sensor information to identify one or more risk factors.

20 Claims, 13 Drawing Sheets

Related U.S. Application Data

(60) Provisional application No. 63/043,561, filed on Jun. 24, 2020, provisional application No. 62/895,390, filed on Sep. 3, 2019.

(51) Int. Cl.
| | |
|---|---|
| *B60W 40/04* | (2006.01) |
| *B60W 40/06* | (2012.01) |
| *B60W 40/08* | (2012.01) |
| *B60W 40/105* | (2012.01) |
| *B60W 40/107* | (2012.01) |
| *G01C 21/00* | (2006.01) |
| *G01C 21/36* | (2006.01) |

(52) U.S. Cl.
CPC ............ *B60W 40/06* (2013.01); *B60W 40/08* (2013.01); *B60W 40/105* (2013.01); *G01C 21/3626* (2013.01); *G01C 21/3691* (2013.01); *G01C 21/3807* (2020.08); *G01C 21/3833* (2020.08); *B60W 40/107* (2013.01); *B60W 2420/403* (2013.01); *B60W 2510/18* (2013.01); *B60W 2510/20* (2013.01); *B60W 2540/229* (2020.02)

(56) References Cited

U.S. PATENT DOCUMENTS

| | | | |
|---|---|---|---|
| 11,040,712 | B2 | 6/2021 | Furukawa |
| 2010/0228419 | A1 | 9/2010 | Lee et al. |
| 2018/0061230 | A1* | 3/2018 | Madigan ............... G08G 1/08 |
| 2018/0162275 | A1 | 6/2018 | Pedersen |
| 2018/0267527 | A1 | 9/2018 | Rubin |
| 2018/0274927 | A1 | 9/2018 | Epperlein et al. |
| 2019/0035268 | A1 | 1/2019 | Madigan et al. |

OTHER PUBLICATIONS

Supplementary Partial European Search Report for Application No. 20860101.3 dated Oct. 11, 2023 (9 pages).

* cited by examiner

800

| Driving mode ↓ / Connected activity → | Navigate (including destination selection) | | | Phone Call | | Text message | | | Etc. |
|---|---|---|---|---|---|---|---|---|---|
| | Destination search | Destination selection | Etc. | Answer incoming | Search contacts | Listen to incoming | Search contacts | Dictate outgoing | |
| Controlled access road driving: | | | | | | | | | |
| - Cruising | | | | | | | | | |
| - Stop and go | | | | | | | | | |
| - Maneuver | | | | | | | | | |
| - Etc. | | | | | | | | | |
| Highway driving: | | | | | | | | | |
| - Approaching intersection | | | | | | | | | |
| - Etc. | | | | | | | | | |
| City driving: | | | | | | | | | |
| - Traffic light | | | | | | | | | |
| - Etc. | | | | | | | | | |

FIG. 8

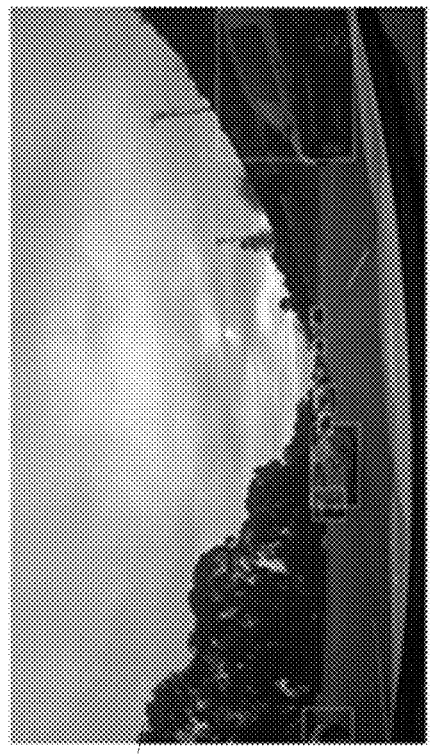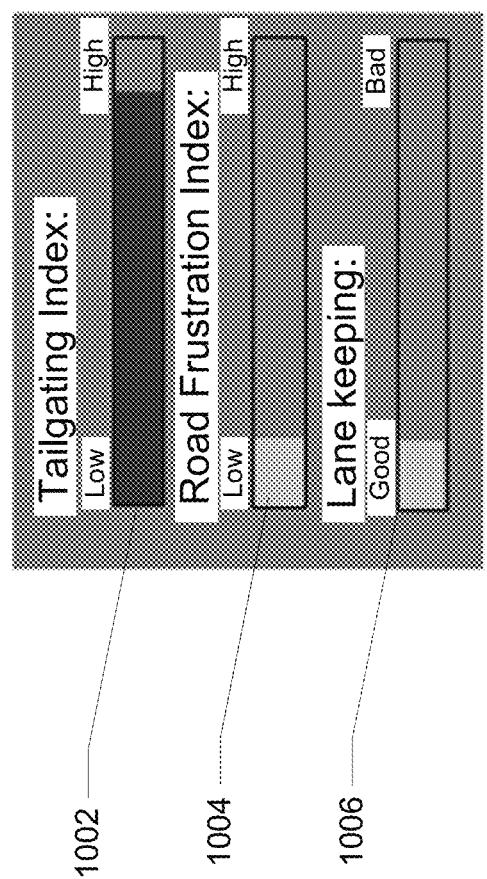
FIG. 11

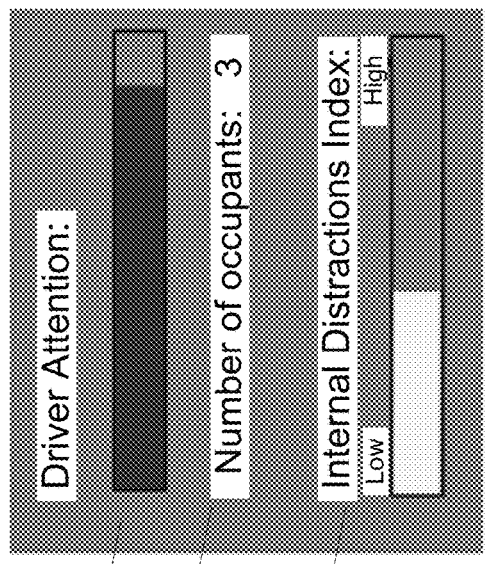
FIG. 12

SYSTEMS AND METHODS OF CONNECTED DRIVING BASED ON DYNAMIC CONTEXTUAL FACTORS

This application is a continuation of and claims priority to U.S. patent application Ser. No. 17/009,228 filed on Sep. 1, 2020, which claims priority to U.S. Provisional Patent Application 63/043,561 filed Jun. 24, 2020, and U.S. Provisional Patent Application 62/895,390 filed Sep. 3, 2019, the contents of each of which are incorporated herein by reference in their entireties.

BACKGROUND

Recently, many vehicles come equipped with global positioning system (GPS) devices that help drivers to navigate roads to various locations. Moreover, many drivers use other mobile devices (e.g., smart phones) that have GPS devices therein to help the drivers navigate roads. These GPS devices may provide location information and use maps for navigation purposes. As GPS devices have become more prevalent, the different uses for their location information have come to light. In some instances, the danger level of different routes is determined by combining location information and accident history information. Although some entities may find the danger level of certain routes useful and interesting, such information alone might not significantly reduce the likelihood of accidents occurring. Therefore, there remains a desire for methods and systems that may help drivers avoid accidents. Moreover, in the event of an accident, there is a desire for methods and systems that utilize information regarding the environment in which the accident occurred to help other drivers avoid a similar accident.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain other aspects of the disclosure include a system comprising one or more sensors coupled to a vehicle and configured to detect sensor information. One aspect of the present disclosure relates to a system configured for mobile data and vehicle communication. The system may include one or more hardware processors configured by machine-readable instructions. The processor(s) may be configured to provide dynamic computer readable recommendations to users to identify and mitigate risk during a driving operation and traveling with the mobile device. The system may receive various types of data information, including but not limited to, accident information, geographic information, environmental information, risk information, and vehicle information from one or more sensors.

The system may calculate a dynamic risk assessment and associate the risk assessment to a particular mobile device. The system may include one or more hardware processors configured by machine-readable instructions. The processor (s) may be configured to calculate a dynamic risk assessment with mobile device derived input data to determine one or more contextual risk assessments from a range of mobile device derived inputs to calculate one or more indexes, such as a tailgating risk index, a road frustration index, a lane keeping index, a driver attention index, an internal distraction index and/or other risk index. Further, the processor(s) may be configured to provide alerts to a user by indicating an identification of a risk alert based on the calculated risk assessment. The processor(s) may be configured to create a risk map that permits a location and contextual (e.g., reflecting traffic and/or weather conditions) assessment of risks. Among other things, this assessment of risks can be used to calculate the safest route, and restrict certain actions (e.g., enable/disable functionality on a mobile device) when conditions are safe/not safe.

In other aspects of the disclosure, a system including one or more sensors, coupled to and in communication with a vehicle, may detect sensor information and provide the sensor information to a computing device for processing. The computing device may be configured to communicate with one or more mobile sensors to receive the mobile sensor information, communicate with the one or more sensors to receive the sensor information; and analyze the sensor information and the mobile sensor information to identify one or more risk factors.

In other aspects of the disclosure, a personal navigation device, mobile device, and/or personal computing device may access a database of risk scores to assist in identifying and indicating alternate lower-risk travel routes.

Aspects of the disclosure may enable consumers to maintain a connected life in a safe manner when they are in the vehicle. Systems and methods described herein may monitor and derive an assessment of the risks that a motorist faces during vehicle operation, and the quantifiable risk that they are facing, and predicted risk in the very near-term future. In other aspects, the systems and methods described herein may help a driver to determine which activities in the connected vehicle they take can undertake with various operations of the mobile device of the user. In some aspects, the systems and methods described herein may make recommendations on which mobile device user activities could be deferred for a threshold period of time or performed at a safer time. In some implementations, the recommendations may include one or more of audio, video, or static image recommendations; or the recommendations may include enabling or disabling features on the mobile device of the user.

Certain other aspects of the disclosure may include a system comprising one or more sensors coupled to a vehicle and configured to detect sensor information. Aspects of the disclosure relate to methods, computer-readable media, and apparatuses for analyzing vehicle operation data, or driving data, and calculating or adjusting a driver score based on the analyzed driving data. One or more computing devices within a vehicle, for example, a mobile device and sensors in the vehicle, may be configured to collect vehicle operational data, driver operational data and transmit the data to a risk assessment server. Vehicle operational data may include various data collected by the vehicle's internal sensors, computers, and cameras, such as the vehicle's speed, rates of acceleration, braking, or steering, impacts to the vehicle, usage of vehicle controls, and other vehicle operational data.

The details of these and other aspects of the disclosure are set forth in the accompanying drawings and descriptions below. Other features and advantages of aspects of the disclosure may be apparent from the descriptions and drawings.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 8 depicts a risk matrix in accordance with aspects of the present disclosure.

FIG. 11 depicts an illustrative user interface in accordance with aspects of the present disclosure.

FIG. 12 depicts an illustrative user interface in accordance with aspects of the present disclosure.

DETAILED DESCRIPTION

In accordance with various aspects of the disclosure, methods, non-transitory computer-readable media, and apparatuses are disclosed for dynamic computer readable recommendations and computer actions to identify and mitigate risk during a driving operation and traveling with the mobile device.

Figure 1:
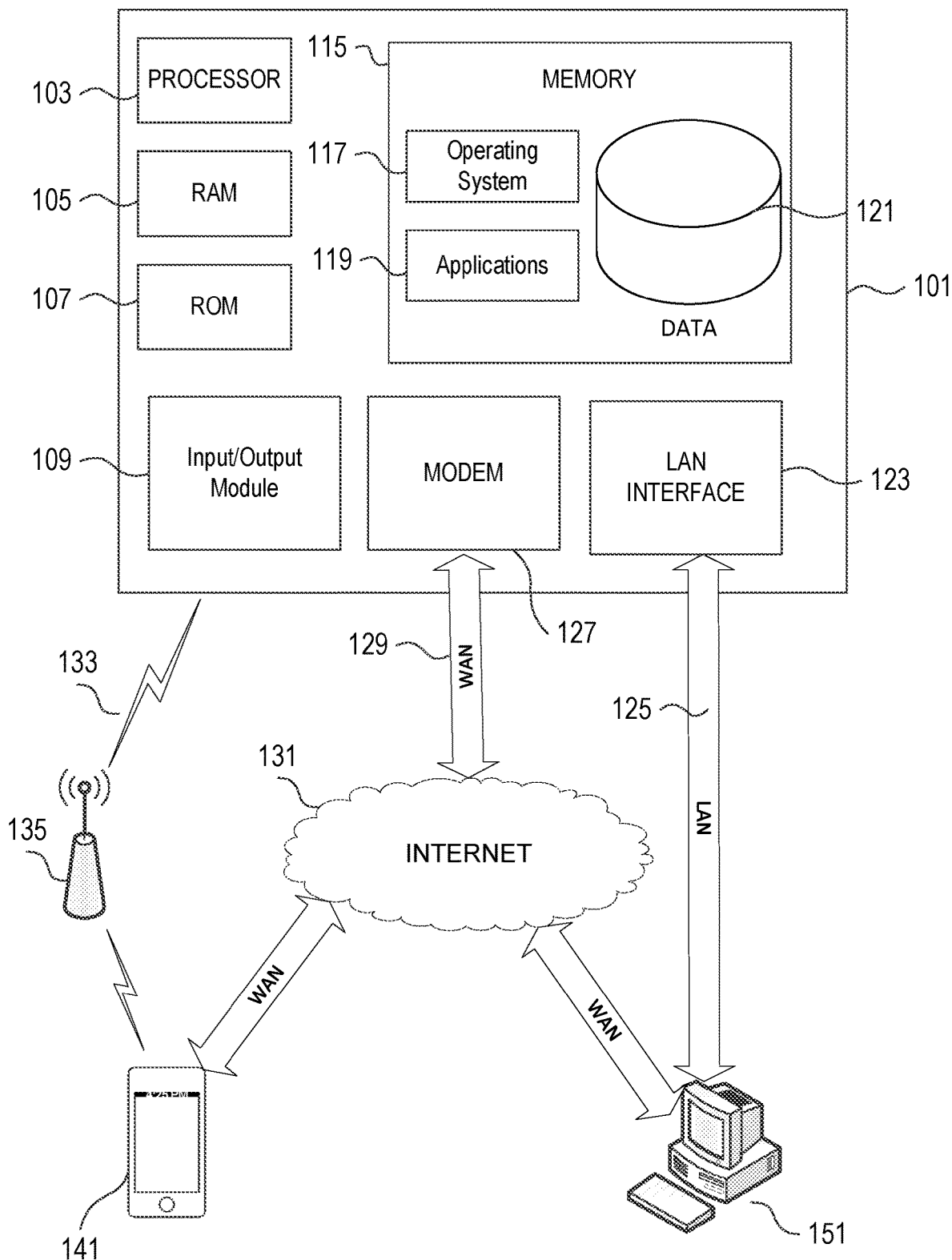
FIG. 1 illustrates an example operating environment in accordance with aspects of the present disclosure.

FIG. 1 illustrates an example of a suitable computing system 100 that may be used according to one or more illustrative embodiments. The computing system 100 is only one example of a suitable computing system and is not intended to suggest any limitation as to the scope of use or functionality contained in the present disclosure. The computing system 100 should not be interpreted as having any dependency or requirement relating to any one or combination of components shown in the illustrative computing system.

The present disclosure is operational with numerous other general purpose or special purpose computing systems or configurations. Examples of computing systems, environments, and/or configurations that may be suitable for use with the disclosed embodiments include, but are not limited to, personal computers (PCs), server computers, hand-held or laptop devices, mobile devices, tablets, multiprocessor systems, microprocessor-based systems, set-top boxes, programmable consumer electronics, network PCs, minicomputers, mainframe computers, distributed computing environments that include any of the above systems or devices, and the like that are configured to perform the processes, functions, and the like, described herein.

With reference to FIG. 1, the computing system 100 may include a computing device 101 wherein the processes discussed herein may be implemented. The computing device 101 may have a processor 103 for controlling the overall operation of the random access memory (RAM) 105, read-only memory (ROM) 107, input/output module 109, memory 115, modem 127, and local area network (LAN) interface 123. Processor 103 and its associated components may allow the computing device 101 to run a series of computer readable instructions related to receiving, storing, generating, calculating, identifying, and analyzing data to generate a risk map. Computing system 100 may also include optical scanners (not shown). Exemplary usages include scanning and converting paper documents, such as correspondence, data, and the like to digital files.

Computing device 101 may include a variety of computer-readable media. Computer-readable media may be any available media that may be accessed by computing device 101 and include both volatile and non-volatile media as well as removable and non-removable media. Computer-readable media may be implemented in any method or technology for storage of information such as computer-readable instructions, data structures, program modules, or other data. Computer-readable media include, but are not limited to, random access memory (RAM), read only memory (ROM), electronically erasable programmable read only memory (EEPROM), flash memory or other memory technology, or any other medium that can be used to store desired information that can be accessed by computing device 101. For example, computer-readable media may comprise a combination of computer storage media (including non-transitory computer-readable media) and communication media.

RAM 105 may include one or more applications representing the application data stored in RAM 105 while the computing device 101 is on and corresponding software applications (e.g., software tasks) are running on the computing device 101.

Input/output module 109 may include a sensor(s), a keypad, a touch screen, a microphone, and/or a stylus through which a user of computing device 101 may provide input, and may also include a speaker(s) for providing audio output and a video display device for providing textual, audiovisual, and/or graphical output.

Software may be stored within memory 115 and/or storage to provide instructions to processor 103 for enabling computing device 101 to perform various functions. For example, memory 115 may store software used by the computing device 101, such as an operation system 117, application program(s) 119, and an associated database 121. Also, some or all of the computer-executable instructions for computing device 101 may be embodied in hardware or firmware.

Computing device 101 may operate in a networked environment supporting connections to one or more remote computing devices, such as computing devices 135, 141, and 151. The computing devices 141 and 151 may be personal computing devices, mobile computing devices, or servers that include many or all of the elements described above about the computing device 101. The computing device 135 may be a transceiver or sensor that includes many or all of the elements described above about computing device 101.

The network connections depicted in FIG. 1 include a local area network (LAN) 125 and a wide area network (WAN) 129, but may also include another type of network. When used in a LAN networking environment, computing device (e.g. in some instances a server) 101 may be connected to the LAN 125 through a network interface (e.g. LAN interface 123) or adapter in the communications module 109. When used in a WAN networking environment, the computing device 101 may include a modem 127 or other means for establishing communications over the WAN 129, such as the Internet 131 or another type of computer network. It will be appreciated that the network connections shown are illustrative, and other means of establishing a communications link between the computing devices may be used. Various well-known protocols such as TCP/IP, Ethernet, FTP, HTTP and the like may be used, and the system may be operated in a client-server configuration to permit a user to retrieve a web page from a web-based server. Further, various conventional web browsers may be used to display and manipulate web pages.

Various aspects described herein may be embodied as a method, a data processing system, or as a computer-readable medium storing computer-executable instructions. For example, a computer-readable medium may store instructions to cause a processor 103 to perform steps of methods described herein. Such a processor 103 may execute computer-executable instructions stored on a computer-readable medium.

Figure 2:
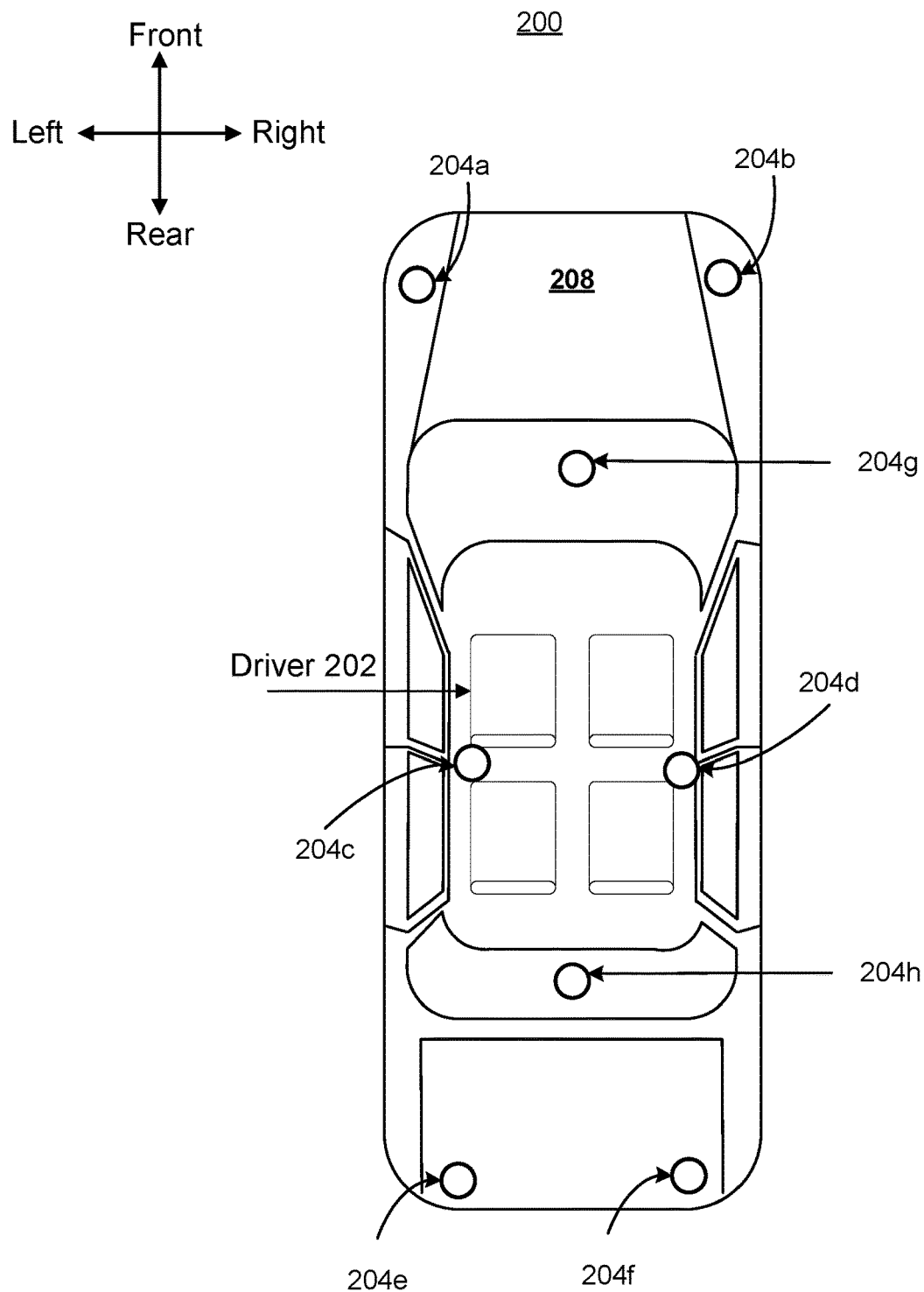
FIG. 2 depicts an example of sensors coupled to a vehicle in accordance with aspects of the present disclosure.

FIG. 2 illustrates an example system in which sensors 204a through 204h are coupled to a vehicle 208. In other examples, only a single sensor 204 may be used. The sensors 204 may be coupled to or otherwise in communication with vehicle 208 in the arrangement shown in FIG. 2 or in other various arrangements (not shown). During operation of the vehicle 208, a user (e.g., driver, passenger, etc.) of the vehicle 208 may be located at the position depicted by identifier 202. Sensors 204 (e.g. 204a through 204h) may be located inside, outside, on the front, on the rear/back, on the top, on the bottom, and/or on each side of the vehicle 208. In some cases, the number of sensors 204 used and positioning of the sensors 204 may depend on the vehicle 208, so that sensor information for all areas surrounding the vehicle 208 may be collected.

The sensor(s) 204 may gather or detect sensor information. The sensor information may comprise data that represents the internal and/or external surroundings of the vehicle 208. In some examples, the sensor information may include data that represents the vehicle 208 itself so that the vehicle's shape and size may be determined from such data. The sensor(s) 204 may comprise a light detection and ranging (LIDAR) sensor, a sound navigation and ranging (SONAR) sensor, a video/image recording sensor, a camera, a light sensor, a thermal sensor, an optical sensor, an acceleration sensor (accelerometer), a vibration sensor, a motion sensor, a position sensor, a technology (e.g., sensing device or scanner) used to sense and detect the characteristics of the sensing device's surroundings and/or environment, and the like. In some embodiments, each sensor 204a through 204h may be the same type of sensor. In other embodiments, sensors 204a through 204h may comprise a combination of different types of sensors. For example, sensor 204a may be a LIDAR sensor, and sensor 204b may be an optical sensor. In some embodiments, the sensors 204 may be specially designed to combine multiple technologies (e.g., a sensor 204 may include accelerometer and LIDAR components). In some aspects, the sensor information may be in the form of vectors. The vectors may be labeled or organized based on classification of each vector. The classification of each vector (and/or sets of vectors) may be generated using a formulaic or machine learning approach. The information the vector contains, or more generally, the sensor information, may be stored, quantized, or interpreted with other approaches, e.g., graph data for semantic inference queries at a later point in time.

The system may gather additional information, such as environmental information, road information, vehicle information, weather information, geographic location information, accident information, etc. Environmental information may comprise data about the surroundings of the vehicle 208. In some embodiments, the environmental information may comprise road, weather, and geographic information. For example, environmental information may comprise data about the type of route the vehicle 208 is traveling along (e.g., if the route is rural, city, residential, etc.). In another example, the environmental information may include data identifying the surroundings relative to the road being traveled by the vehicle 208 (e.g., animals, businesses, schools, houses, playgrounds, parks, etc.). As another example, the environmental information may include data detailing foot traffic and other types of traffic (e.g. pedestrians, cyclists, motorcyclists, and the like).

Road information may comprise data about the physical attributes of the road (e.g., slope, pitch, surface type, grade, and the like). In some aspects, the physical attributes of the road may comprise a pothole(s), a slit(s), an oil slick(s), a speed bump(s), an elevation(s) or unevenness (e.g., if one lane of road is higher than the other, which often occurs when road work is being done), etc. In some embodiments, road information may comprise the physical conditions of the road (e.g., flooded, wet, slick, icy, plowed, not plowed/snow covered, etc.). In some instances, road information may be data from a sensor that gathers and/or analyzes some, most, or all vertical changes in a road. In other examples, road information may include information about characteristics corresponding to the rules of the road or descriptions of the road: posted speed limit, construction area indicator (e.g., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of roads/lanes, population density, condition of road (e.g., new, worn, severely damaged with sink-holes, severely damaged by erosion, gravel, dirt, paved, etc.), wildlife area, state, county, and/or municipality. In some embodiments, road information may include data about infrastructure features of the road. For example, infrastructure features may include intersections, bridges, tunnels, railroad crossings, and other roadway features.

Weather information may comprise data about the weather conditions relative to a vehicle's 208 location (e.g., snowing, raining, windy, sunny, dusk, dark, etc.). In some aspects, weather information may include a forecast of potential weather conditions for a segment of a road being traveled by vehicle 208. For example, weather information may include a storm warning, a tornado warning, a flood warning, a hurricane warning, etc. In some aspects, weather information may provide data about road segments affected by weather conditions. For example, weather information may detail which roads are flooded, icy, slick, snow-covered, plowed, or closed. As another example, the weather information may include data about glare, fog, and the like.

Vehicle information may comprise data about how the vehicle 208 is operated (e.g., driving behavior and/or vehicle operation data). In some embodiments, a vehicle telematics device may be used to gather information about operation of a vehicle. For example, the vehicle telematics device may gather data about the braking, accelerating, speeding, and turning of a vehicle 208. In some aspects, vehicle information may comprise accident information (which will be described later). For example, vehicle information may include data that describes incidents (e.g., vehicle accidents) and a particular location where the incident occurred (e.g., geographic coordinates associated with a road segment, intersection, etc.). In some aspects, vehicle information may include the vehicle make, vehicle model, vehicle year, and the like. In some instances, vehicle information may comprise data collected through one or more in-vehicle devices or systems such as an event data recorder (EDR), onboard diagnostic system, or global positioning satellite (GPS) device. Examples of information collected by such devices include speed at impact, brakes applied, throttle position, direction at impact, and the like. In some examples, vehicle information may also include information about the user (e.g., driver, passenger, and the like) associated with the vehicle 208.

In some aspects, user information may include data about a user's age, gender, marital status, occupation, blood alcohol level, credit score, eyesight (e.g., whether the user wears glasses and/or glasses prescription strength), height, and physical disability or impairment, as provided by the user and as used with appropriate permission of the user. In some instances, user information may include data about the user's distance from a destination, route of travel (e.g., start destination and end destination), and the like. In some embodiments, the user information may comprise data about the user's non-operation activities while operating a vehicle 208. For example, the data may comprise the user's mobile phone usage while operating the vehicle 208 (e.g., whether the user was talking on a mobile device, texting on a mobile device, searching on the internet on a mobile device, etc.), the number of occupants 1010 in the vehicle 208, the time of day the user was operating the vehicle 208, etc.

Geographic location information may comprise data about the physical location of a vehicle 208. For example, the geographic location information may comprise coordinates with the longitude and latitude of the vehicle, or a determination of the closest address to the actual location of the vehicle 208. In another example, the vehicle location data may comprise trip data indicating a route the vehicle 208 is traveling along. In some aspects, the geographic location information may also include information that describes the geographic boundaries, for example, of an intersection (e.g. where vehicle 208 is located) which includes all information that is associated within a circular area defined by the coordinates of the center of the intersection and points within a specified radius of the center. In some embodiments, geographic location information may consist of numerous alternative routes a vehicle 208 may travel to reach a selected destination.

Accident information may comprise information about whether a vehicle 208 was in an accident. In some aspects, accident information may identify damaged parts of the vehicle 208 resulting from the accident. For example, accident information may detail that the front bumper, right door, and right front headlight of the vehicle 208 were damaged in an accident. In some examples, accident information may detail the cost of replacement or repair of each part damaged in an accident. In some instances, accident information may include previously described vehicle information. In some embodiments, accident information may include data about the location of the accident with respect to a road segment where the accident occurred. For example, accident information may include where the accident occurred on the road segment (e.g., which lane), the type of road the accident occurred on (e.g., highway, dirt, one-way, etc.), time of day the accident occurred (e.g., daytime, night time, rush hour, etc.), and the like.

Some additional examples of accident information may include loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident.

Accident information associated with vehicle accidents may be stored in a database format and may be compiled per road segment and/or risk map. One skilled in the art will understand that the term road segment may be used to describe a stretch of road between two points as well as an intersection, roundabout, bridge, tunnel, ramp, parking lot, railroad crossing, or other feature that a vehicle 208 may encounter along a route.

Figure 3:
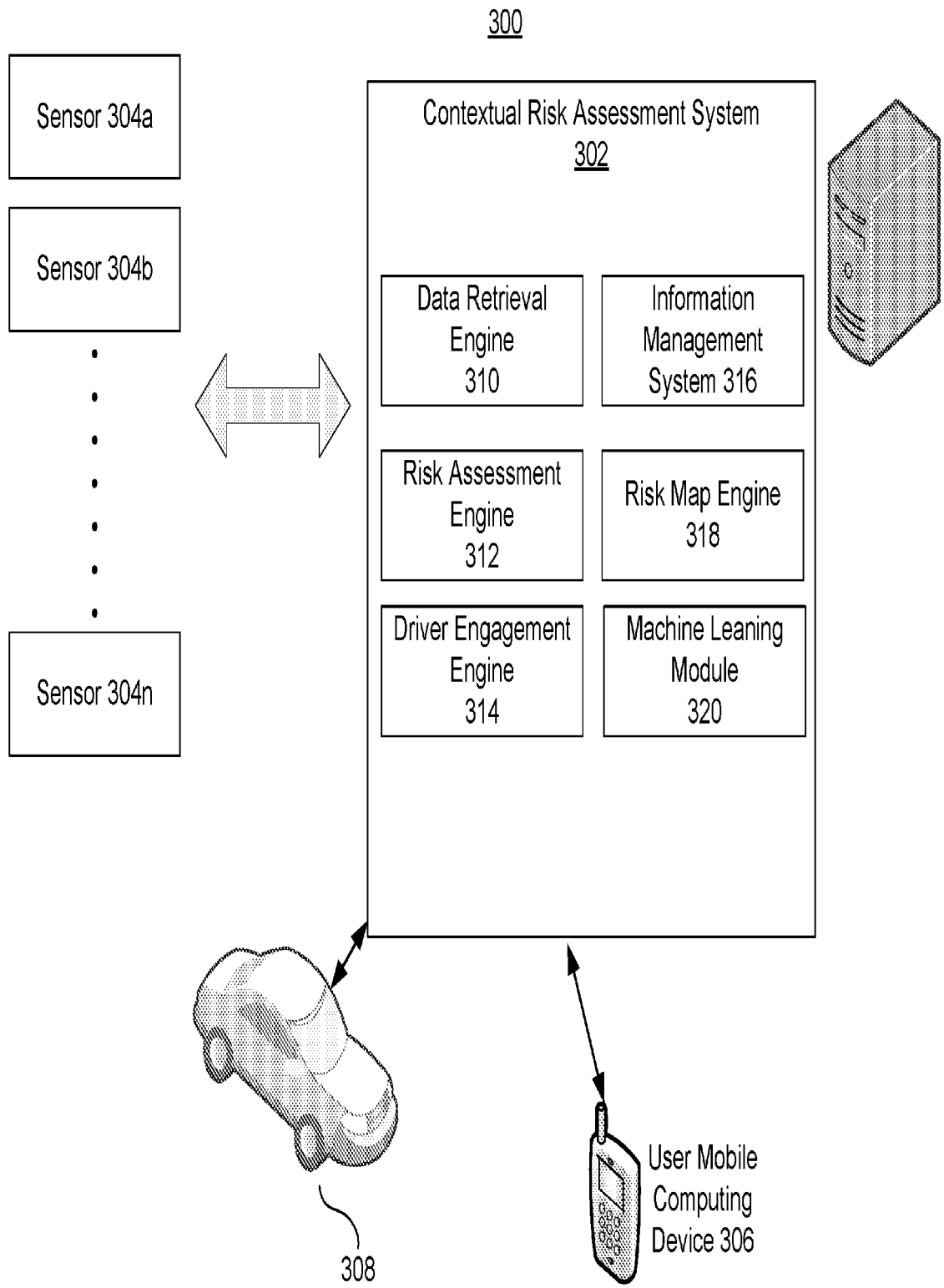
FIG. 3 depicts another example operating environment in accordance with aspects of the present disclosure.

FIG. 3 illustrates a computing system 300 for generating a contextual risk assessment based on sensor information. Computing system 300 may include a contextual risk assessment system 302, sensor(s) 304, mobile computing device 306, and vehicle 308. In some embodiments, computing device 101 shown in FIG. 1 may comprise the contextual risk assessment system 302. In other embodiments, contextual risk assessment system 302 may comprise or be similar to the previously described computing devices 101, 141, or 151. In some aspects, sensor(s) 304 may be similar to the previously described sensor(s) 204*a-h*. For example, sensor(s) 304 may be coupled to or otherwise in communication with a vehicle 308. In some instances, vehicle 308 may be similar to the previously described vehicle 208. In some examples, a user mobile computing device 306 may be similar to the previously described computing devices 101, 141, or 151.

The contextual risk assessment system 302 may comprise various modules/engines for generating a risk assessment value. Machine-readable instructions may include one or more instruction modules 302, 310, 312, 314, 316 and 320.

The instruction modules may include computer program modules. For example, a contextual risk assessment system 302 instruction modules may include one or more of a data retrieval engine 310, risk assessment engine 312, a driver instruction/engagement engine 314, an information management system 316, risk map generation engine 318 and optionally, machine learning module 320.

The data retrieval engine 310 may request or receive information from other computing devices and sensors. For example, a data retrieval engine 310 may receive sensor information from sensor(s) 304, data from mobile computing device 306, and/or instructions/data from a user device or network device (not shown). A data retrieval engine 310 may receive different types of sensor information as those previously described. For example, a data retrieval engine 310 may obtain environmental information, vehicle information, weather information, and the like. In some aspects, a data retrieval engine 310 may receive and use the sensor information (e.g., x-plane information, y-plane information, and z-plane information) to determine whether a vehicle 308 is moving up or down.

The risk assessment engine 312 may receive vehicle sensor information data, mobile device sensor information data and utilize the information data to complete different tasks. For example, the contextual risk assessment system 302 may receive sensor information from sensor(s) 304, and communicate with (e.g., transmit to and receive from) mobile computing device 306 in order to generate a risk map. In another example, the contextual risk assessment system 302 may use received information and contextual risk assessment system modules to develop alerts and recommendations, which may help to alert a driver of potential risks and with the use of the mobile device. A risk (e.g., potential risk) may comprise anything that may create a dangerous driving condition or increase a likelihood of a vehicle 308 getting into an accident. A risk map created by risk map engine 318 may comprise an image (e.g., JPEG, TIFF, BMP, etc.), a video (e.g., MPEG), a hologram, or other visual outputs for illustrating a road segment or route being traveled by a vehicle 308. The risk map may further include markers or other indicators of risks (e.g. risk objects).

Risks may be any item, event, or condition that may pose a danger to a vehicle 308 while the vehicle 308 is on a trip. In various embodiments, the risk map may be a two-dimensional (2D) or a three-dimensional (3D) illustration. Further, in some embodiments, the risk map may dynamically change over time. The changes may be in accordance with geographic data indicating the vehicle's location and/or other data (e.g., speed data indicating a speed of the vehicle or odometer data indicating distance the vehicle traveled). In some embodiments, the risk map may be keyed or coded (e.g., certain symbols, colors, and the like that represent different risks or categorize the risk objects within the risk map).

Figure 13:
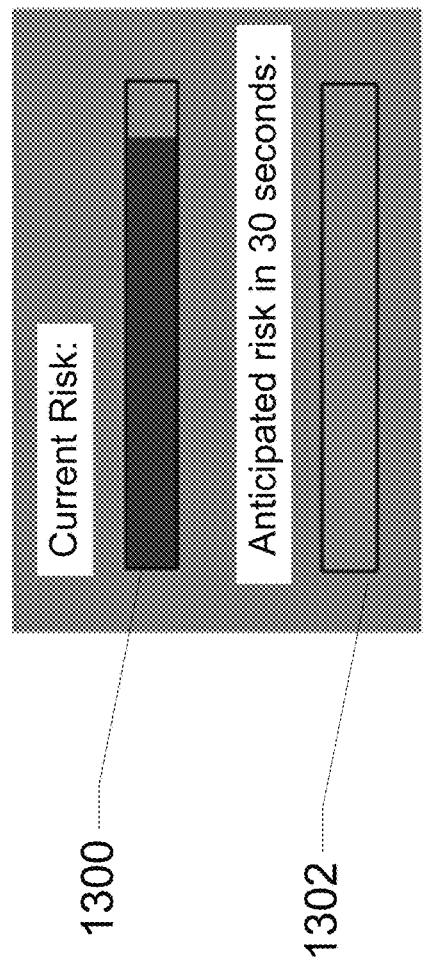
FIG. 13 depicts an illustrative user interface in accordance with aspects of the present disclosure.

Referring to FIGS. 3 and 8, driving mode content activity risk matrix 800 provide features that that can happen on a mobile device 306 (or the mobile device 700 of FIG. 7) with driving tasks or tasks a user might perform on the mobile device for a safe driving window. As shown in FIG. 8, the "y-axis" or vertical axis of the driving mode content activity risk matrix 800 indicates a driving mode, while the "x-axis" or horizontal axis driving mode content activity risk matrix 800 indicates connected activity on the user's mobile device 306. During the driving mode various connected activities may be enabled or disabled, which are described in greater detail below, for example, with respect to FIGS. 9A-9C. Risk assessment engine 312 may use data inputs in combination with risk map engine 318 to arrive at an overall contextual risk score so as to enable and disable certain driving and user mobile device activities based on the risk score and provide a dynamically updated current risk score. In another implementation, risk assessment engine 312 may predict future risk scores (e.g., 30 seconds ahead, 1 minute ahead, 5 miles ahead) as to enable driving and mobile device activities as to enable and disable certain driving and mobile device activities. For example, the user interface of FIG. 13 shows an overall contextual risk assessment 1300, based on current information, and a future risk score 1302, e.g., 30 second ahead.

Figure 7:
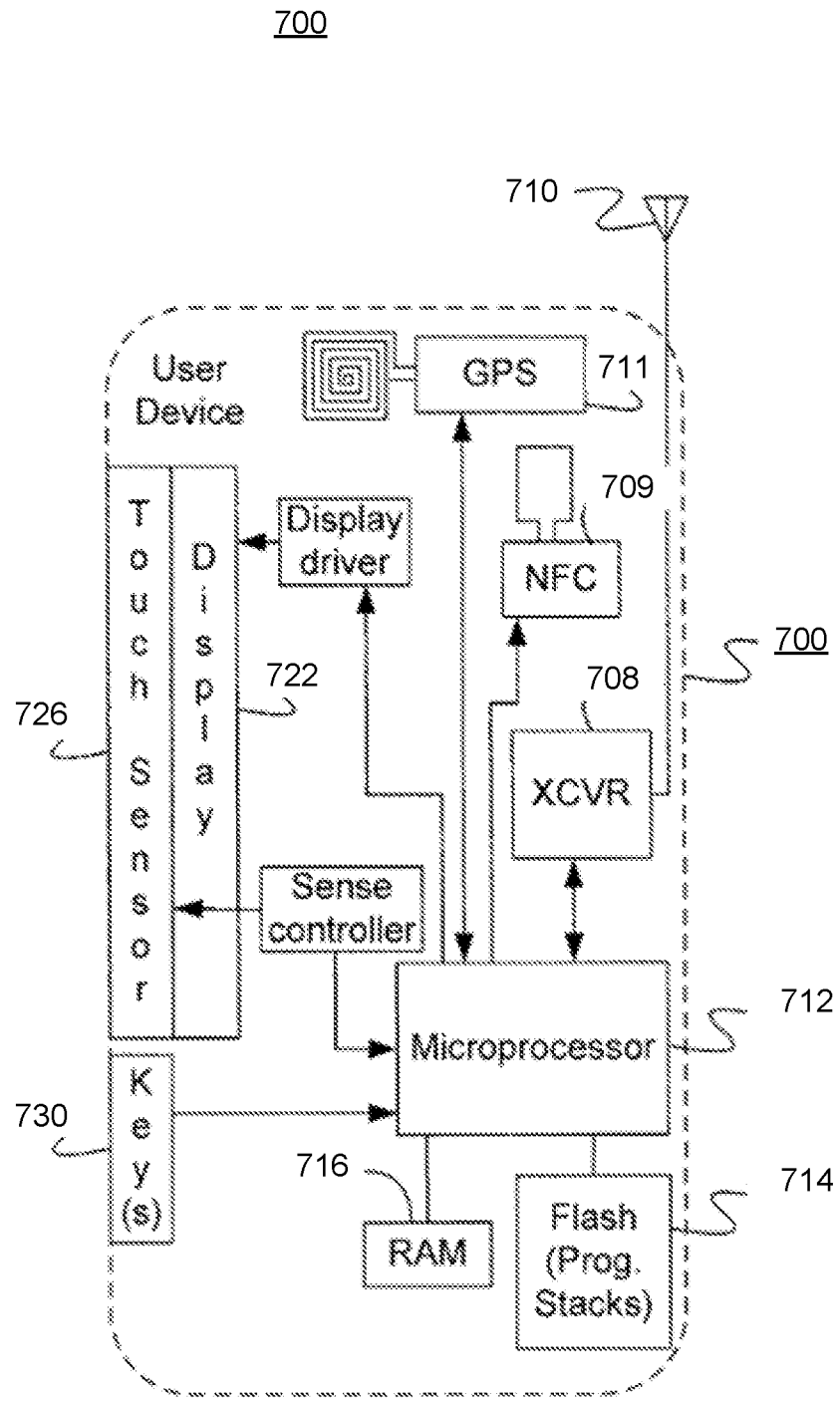
FIG. 7 depicts a functional block diagram of a mobile communication device in accordance with aspects of the present disclosure.

The driver engagement engine 314 may generate recommendations of the mobile device 306 to interface to provide visual, audio, or haptic feedback. In some aspects, the driver engagement engine 314 may determine how to display a recommendation on the display screen of the mobile device 306. In one example, as shown in FIG. 7, mobile device 700 includes a display screen 726 may indicate an upcoming predicted safe driving condition with a "green" color indication. In another example, a "yellow" color screen may indicate an upcoming predicted cautious driving maneuver. In yet another example, a display screen 722 may indicate an upcoming predicted safe driving condition with a "green" color indication, and then dynamically adjust to a "yellow" color screen to indicate an upcoming predicted cautious driving maneuver. For example, if the system 302 knew the person's intended route, system 302 could calculate a forecast of it for the entire route, and indicate if the user wants to make a phone call, the safe operation window is not now, but in 10 minutes. The system 302 could forecast that the vehicle will be merged onto an express way and pass a traffic jam at 10 minutes, so then the phone call would be "safer" (e.g., less risky) in the future. In another implementation of the forecast scenario, system 302 may collect that information and can automatically make the call in 10 minutes. That is, the call can be automatically established in 10 minutes after the traffic hazard has passed.

In some aspects, the driver engagement engine 314 may determine how to provide an audio recommendation via the speaker of the mobile device 306 or over the vehicle 308 audio emanating from the mobile device 306. In one example, while an audio music is playing, an audio announcement "voice over" could provide a safe turn recommendation or the audio announcement could pause the music before playing the announcement. In some aspects, the driver engagement engine 314 may determine how to display a recommendation on the display screen of the mobile device 306. In another aspect, the driver engagement engine 314 may enable the floor or seat of the vehicle 308 to vibrate or the mobile device 306 to vibrate for the haptic feedback engagement.

In some aspects, the recommendation from the driver engagement engine 314 may be a color (or color change), an animation, a sound, a vibration, and the like for indicating the level of risk associated with an upcoming driving activity or mobile device activity. For example, the display screen may be displayed in yellow when a moderate risk to a vehicle 308 is determined or displayed in red if it is a severe risk to the vehicle 308. In another example, one sound may be played for a low risk while a different sound may be played for a high risk. In another example, if a risk is identified as being located at the front of the vehicle 308, then the floor or seat of the vehicle 308 may vibrate. In another example, if a risk is identified as being located at the back/rear of the vehicle 308, then the back of the seat(s) of the vehicle 308 may vibrate. In some examples, if a risk is identified as being located on the left side of the vehicle 308, then a sound may play out of the left speaker(s) of the vehicle 308. In some examples, if a risk is identified as being located on the right side of the vehicle 308, then a sound may play out of the right speaker(s) of the vehicle 308.

Information management system 316 may organize and store all the information the risk assessment system 302 generates, transmits, and receives. System 316 may store training data sets and self-learning data set for machine learning module 320.

Figure 5:
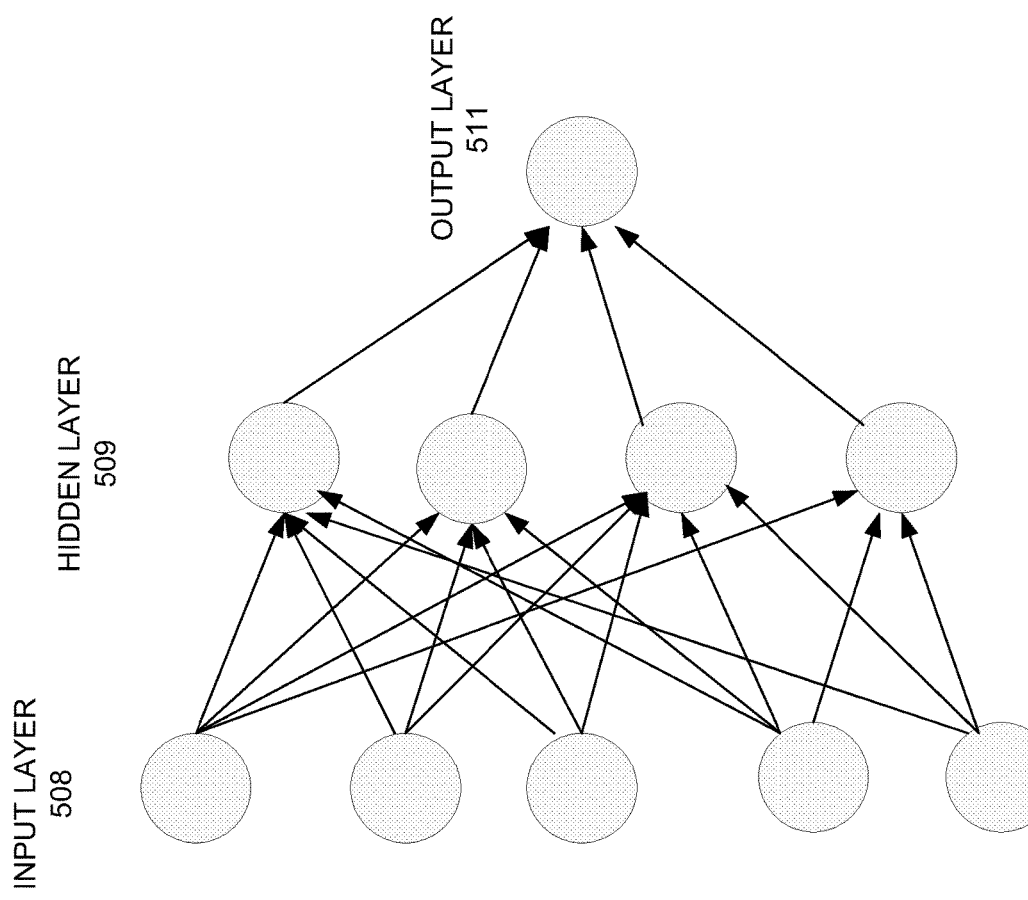
FIG. 5 depicts an illustrative functional block diagram of a neural network that may be used to implement the processes and functions described herein, in accordance with aspects of the present disclosure.

Some aspects of various exemplary constructions are described by referring to and/or using neural network(s). Machine learning module 320 may be configured to electronically process with a machine deep learning controller. Various structural elements of neural network include layers (input, output, and hidden layers), nodes (or cells) for each, and connections among the nodes. Each node may be connected to other nodes and has a nodal value (or a weight) and each connection can also have a weight. The initial nodal values and connections may be random or uniform. A nodal value/weight may be negative, positive, small, large, or zero after a training session with training data set. Computer networks 203, 201 may incorporate various machine intelligence (MI) neural network 500 (see FIG. 5) features of available TENSORFLOW (https://www.tensorflow.org), KERAS (a component of Tensorflow), or NEUROPH software development platforms (which are incorporated by reference herein). Referring to FIG. 5, neural network 500 is generally arranged in "layers" of node processing units serving as simulated neutrons, such that there is an input layer 508, representing the input fields into the network. To provide the automated machine learning processing, one or more hidden layers 509 with machine learning rule sets may process the input data. An output layer 511 may provide the result of the processing of the network data.

With continued reference to FIG. 3, machine learning module 320 may implement deep learning machine learning techniques, such as techniques implementing a representation of learning methods that allows a machine to be given raw data and determine the representations needed for data classification. Deep learning may include a subset of machine learning that uses a set of algorithms to model high-level abstractions in data using a deep graph with multiple processing layers including linear and non-linear transformations. In some examples, the deep learning network of machine learning module 320 may train itself to identify "good" features for analysis. Using a multilayered architecture, such as network 500 of FIG. 5, machine learning module 320 may employ deep learning techniques to better process raw data. Examining data for groups of highly correlated values or distinctive themes may be facilitated using different layers of evaluation or abstraction.

Deep learning ascertains structure may be employed in data sets described herein using backpropagation algorithms which are used to alter internal parameters (e.g., node weights) of the deep learning machine. Deep learning machines may utilize a variety of multilayer architectures and algorithms, and may process raw data to identify features of interest without the external identification.

In some implementations, machine learning module 320 may include a deep learning engine in a neural network environment that includes numerous interconnected nodes referred to as neurons. Input neurons, activated from an outside source, may activate other neurons based on connections to those other neurons which are governed by the machine parameters. A neural network may behave in a certain manner based on its own parameters. Learning may refine the machine parameters, and, by extension, the connections between neurons in the network, such that the neural network behaves in a desired manner.

One implementation of machine learning module 320 may include deep learning technology that may utilize convolutional neural network segments data using convolutional filters to locate and identify learned, observable features in the data. Each filter or layer of the convolutional neural network architecture may transform the input data to increase the selectivity and invariance of the data. This abstraction of the data may allow the machine learning module 320 to focus on the features in the data it is attempting to classify and ignore irrelevant background information.

Deep learning operates on the understanding that many datasets include high level features which include low level features. While examining an image, for example, such as computer system diagrams, rather than looking for an object, it is more efficient to look for edges which form motifs which form parts, which form the object being sought. These hierarchies of features can be found in many different forms of data such as speech and text, etc. This type of data can be used from the mobile device 306 camera (front-facing and/or rear-facing camera).

In some implementations, learned observable features may include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given example training dataset.

An example deep learning neural network may be trained on a set of expert classified data, for example. This set of data may build the first parameters for the neural network, and this would be the stage of supervised learning. During the stage of supervised learning, the neural network may be tested based on whether the desired behavior has been achieved.

Once a desired neural network behavior has been achieved (e.g., a machine learning module 320 has been trained to operate according to a specified threshold, etc.), the machine learning module 320 can be deployed for use (e.g., testing the machine with "real" data, etc.). During operation, neural network classifications may be confirmed or denied (e.g., by an expert user, expert system, reference database, etc.) to continue to improve neural network behavior. The example neural network may then in a state of transfer learning, as parameters for classification that determine neural network behavior are updated based on ongoing interactions. In certain examples, the neural network may provide direct feedback to another process. In certain examples, the neural network may output data that is buffered (e.g., via the cloud, etc.) and validated before it is provided to another process.

The engines/modules/systems 302, 310, 312, 314, 316, 318 and 320 may, individually or in combination, comprise one or more processors and memory storage devices (as previously described with reference to FIG. 1) for executing instructions causing one or more computing devices to execute the operations and/or tasks previously described with respect to engines/modules/systems 302, 310, 312, 314, 316, 318 and 320. The engines/modules/systems 302, 310, 312, 314, 316, 318 and 320 and other modules may implement application programming interfaces (APIs) containing functions or sub-routines which can be executed by another software system, such as email and internet access controls. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

A user device such as mobile phone device 306, 700 may be used to sense user information of the driver or other user's mobile devices in the vehicle 308. Referring to FIG. 13, this "mobile device derived input data" may be used to determine one or more contextual risk assessments 1300 from a range of mobile device 306, 700 derived inputs to calculate one or more indexes, such as a tailgating risk index 1002, a road frustration index 1004, a lane keeping index 1006, a driver attention index 1008, an internal distraction index 1012 or other risk index (see FIGS. 10-13). In one implementation, the use of mobile device 306, 700 cameras can capture data to assess risks (both forward-facing camera and selfie camera). In some implementations, the system may increase the sampling rate of each camera based on risk assessment factors. The rear-facing camera (selfie camera) may be employed to derive a driver attention index 1008. In this implementation, the internal movements in the vehicle interior of the occupants may be monitored. In other implementations, the mobile device 306, 700 with a formulaic or machine learning approach may determine from monitoring the rear-facing camera factors, such as the number of passengers or occupants 1010, and internal cabin distractions (e.g., pets, dropped object).

In another implementation, the system 302 may integrate input from each of the mobile device 306, 700 cameras to adjust the operation of the other camera, e.g., if driver is fully attentive based using on the selfie camera and driver attention index, then the system emphasizes collection and analysis of data from the forward camera. In another implementation, if forward camera shows a risky situation based one of more of a tailgating index 1002, road frustration index 1004, or lane keeping index 1006, then the system 302 uses (e.g., initiates, activates, enables, or the like) selfie camera to measure the driver attention index 1008 more closely. In some implementations, the use mobile device 306, 700 microphone may be employed to determine an internal distraction index derived from sounds that might indicate unusual distractions inside the vehicle such as boisterous activity (e.g., teens getting out of control), a crying baby, dog barking, shouting; namely sounds of activity that could lead to distracted driving.

Figure 4:
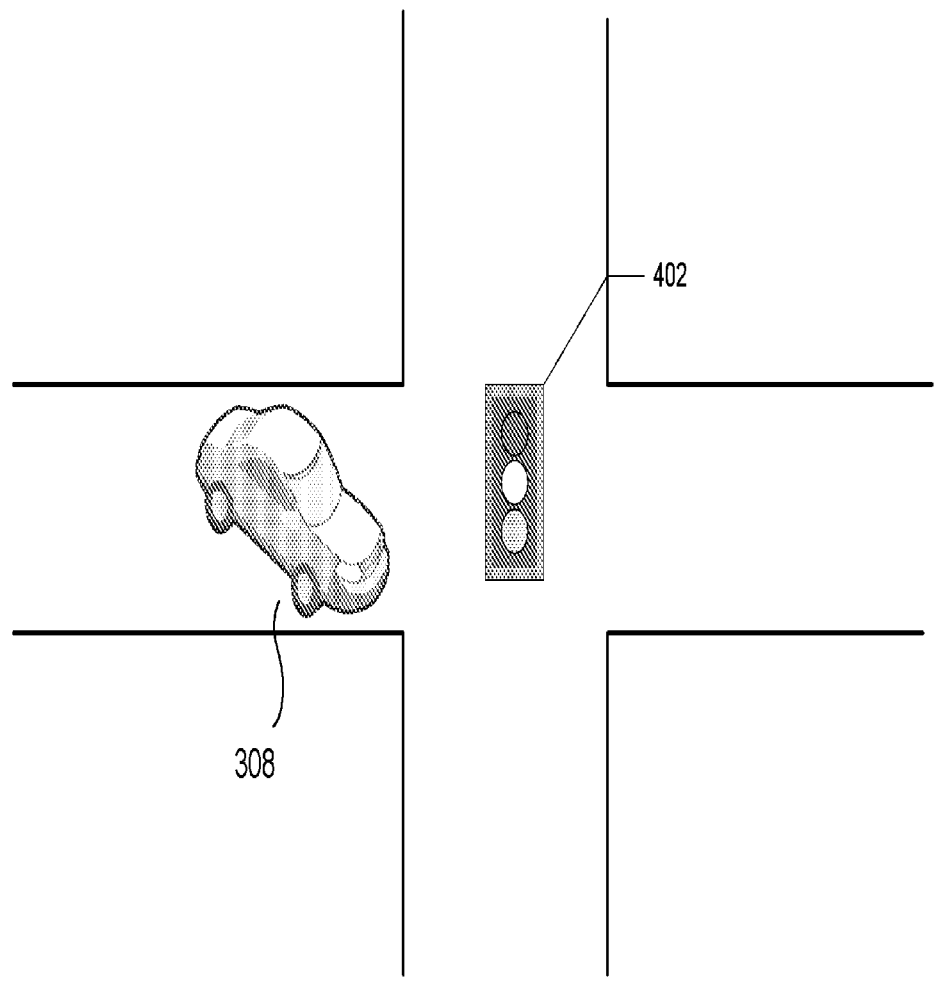
FIG. 4 depicts an illustrative user scenario and user interface that may be displayed in accordance with aspects of the present disclosure.

In various operations the risk assessment system 302 provides for a "safe operation" window for dynamically updating the contextual risk assessment. In some implementations, the system 302 may enable or disable certain features at traffic intersections because intersections can be an area of a higher risk for accidents. The system 302 with forward facing camera may detect traffic light 402 and intersection 400, such as shown in FIG. 4, thus enabling/disabling certain features of the vehicle and mobile device so as encourage drivers to focus on driving, instead of high risk activities (e.g., texting or other mobile device activities). In some implementations, the system 302 permits a wide range of connected life activities while the vehicle is stopped at a traffic light 402. The system 302 can determine a traffic light status by combining and analyzing various data inputs, mobile device 306, 700 sensor data, such as GPS data, accelerometer data, image data from the forward facing camera and/or risk data from risk map engine 318.

In some implementations, system 302 can use the forward facing camera of mobile device 306, 700 to determine activity around a traffic light 402 such as when the traffic light changed color, the presence of stopped car in front of the vehicle, detect movement of car in front (following light changing to green). In one implementation, a machine learning module 320 of system 302 can build a "self-learning" data set in system 316 that estimates the duration of a traffic light and may collect data on time between light changes for each intersection; to find patterns to provide enhanced recommendations. In another implementation, system 302 with module 320 can estimate time available at a traffic light based on factors such as the self-learning data set (which indicates typical duration of a light sequence), timing of traffic light change as captured by the forward-facing camera, when the time vehicle stops. In other implementations shown in FIG. 9C, system 302 can provide a "countdown clock" based on the estimated time until the traffic light changes and enable the connected life activity during this window.

In some implementations, system 302 can determine an end of "connected life activity" window based on one or more of: an expiration of countdown clock, movement of the vehicle, or movement of vehicle ahead of the vehicle. In some implementations, system 302 once the vehicle starts moving, system 302 can suspend connected life activity (e.g., disable/enable functionality) until a next safe window (e.g., when stopped at the next traffic light) In some implementations, system 302 can invoke a suspension mode to enable rapid, efficient resumption when next safe window opens (i.e., pick up where the system finished left off).

In various operations the risk assessment system 302 can provide a "safe operation" window for dynamically updating the contextual risk assessment using risk map engine 318 to determine what, if any, special turn lanes and signals exist at an intersection. In one use case example, vehicle stopping time at a traffic light can vary depending on what maneuver a driver takes at the intersection. Left turns can be subject to turn arrows that are on a different timing sequence than, "straight thru" traffic lights. Right turns might require a full stop after which the motorist can make the right turn when it is safe to do so (assuming there is not a "no right turn on red" sign). In one implementation, system can determine what maneuver a driver intends at the intersection and set the "countdown" clock according to the expected wait time for that maneuver. For instance, if the driver has predetermined specified a route (rather than simply driving without having specified destination and therefore an intended route), the navigation functionality of the system 302 would know that the driver intends to make a left turn. In this case, system 302 can set the countdown clock based on the timing sequence that applies to the left turn signal.

In another implementation of system 302, if the driver has not specified a route, the forward-facing camera of mobile device 306 may determine that the driver is in the left-turn lane and select the timing sequence that applies to the left turn signal. This determination may be made by one of the following or several factors in combination: a forward facing camera, machine vision traffic signage recognition, machine vision lane markings recognition, and/or determining actions taken by motorists ahead of or alongside the ego vehicle (for instance, are they signaling and taking left turns). This may help determine what lane the motorist is in (left turn, straight, right turn).

Figure 6:
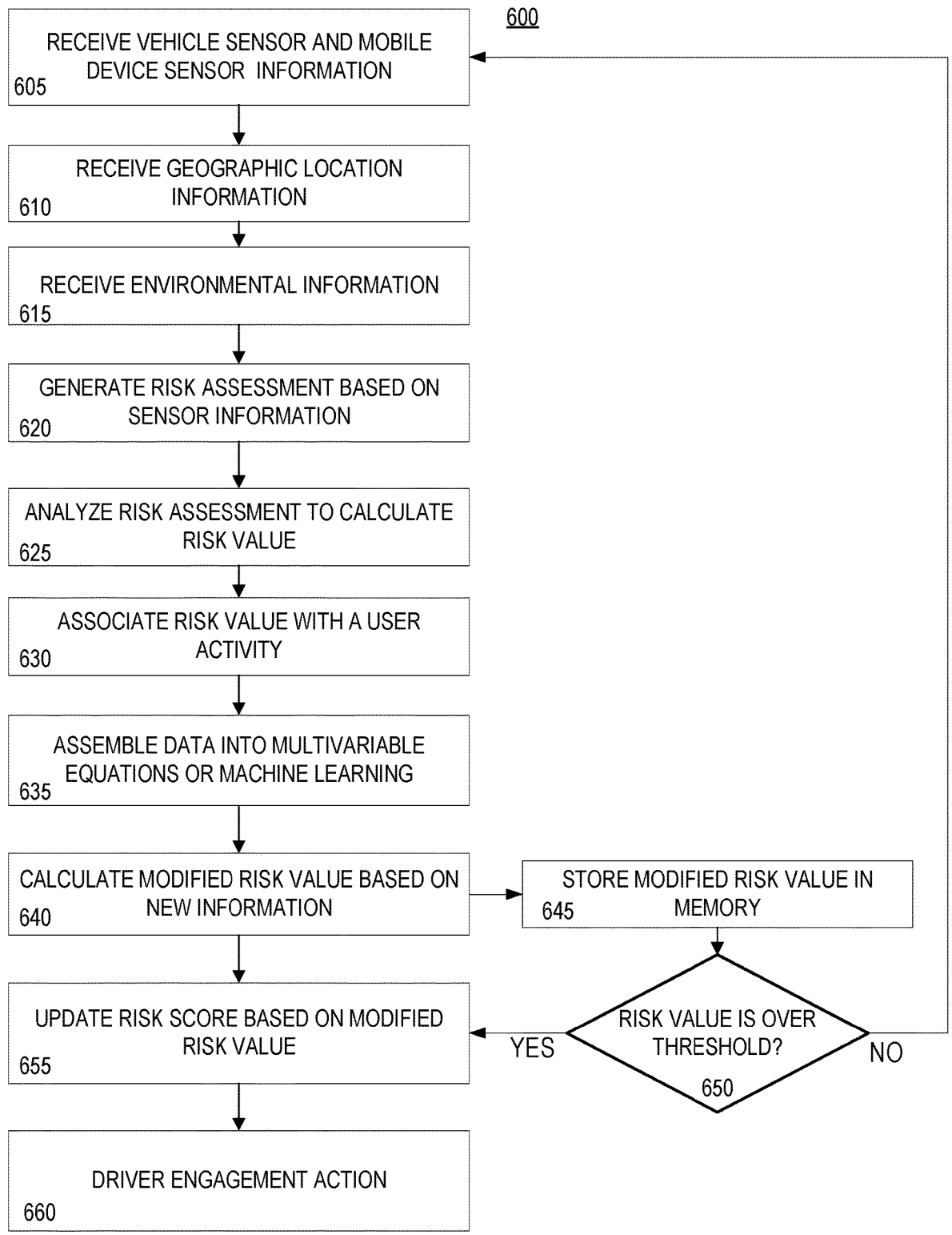
FIG. 6 depicts a flowchart of an example process in accordance with aspects of the present disclosure.

FIG. 6 illustrates a flowchart 600 for an operation for risk assessment and a recommendation that may be provided to a user. The operation may begin at step 605. At step 605, a risk assessment system 302 may receive sensor information from various sensors (e.g. sensor(s) 304 and mobile device sensors). In some aspects, the risk assessment system 302 may store the received sensor information. In some examples, the sensor information may be the same as the sensor information previously described. In some embodiments, the risk assessment system 302 may receive sensor information from mobile computing device 306, a network device, or other computing devices. After step 605, the method may proceed to step 610.

At step 610, a risk assessment system 302 may receive geographic information (e.g., geographic location information). In some embodiments, the risk assessment system 302 may receive the geographic location information as part of the sensor information. In some aspects, the risk assessment system 302 may receive the geographic location information from a GPS device installed in a vehicle, mobile computing device 306, or another computing device. For example, in step 610, the risk assessment system 302 may receive GPS coordinates from a mobile phone of a driver of a vehicle via a cellular backhaul. In some instances, the geographic location information may comprise the same geographic location information as previously described. For example, the geographic location may comprise latitude and longitude coordinates of vehicle 308. After step 610, the method may proceed to step 615.

At step 615, the risk assessment system 302 may receive environmental information. In some embodiments, the risk assessment system 302 may receive the environmental information from a mobile computing device 306 or another computing device located in or on the vehicle. Additionally, or alternatively, the risk assessment system 302 may receive environmental information from a network device (e.g., a third party server, such as a server of a weather reporting organization). In some instances, the network device may be a computing device or a server similar to the risk assessment system 302, and may be operated by an insurance company. In some examples, the network device may contain environmental information about various routes, various road segments, various risk objects, and/or various risk maps that may be related to a route that a vehicle 308 may be traveling along. In some instances, the environmental information may comprise data about routes, road segments, risk objects, and/or risk maps. In some examples, the environmental information may be similar to environmental information previously described. In other embodiments, the risk assessment system 302 may receive environmental information from another computing device (system) associated with a different vehicle. In another embodiment, the risk assessment system 302 may receive environmental information regarding a road segment, via a computing device responsible for tracking the conditions of the road segment. In some embodiments, the risk assessment system 302 may receive environmental information from a structure/infrastructure (e.g. building, bridge, railroad track, etc.) via a computing device configured to monitor the structure. After step 615, the method may proceed to step 620.

At step 620, the risk map engine 318 may generate a risk map based on the received information, individually or combined, from steps 605, 615, and 620. In some embodiments, the risk assessment system 302 may generate a risk map using sensor information. In some aspects, the risk assessment system 302 may analyze and manipulate the sensor information in order to create images, figures, and the like that represent a map or an environment that a vehicle 308 may be traveling through. In some instances, the manipulation of sensor information may comprise interpreting input information (e.g., sensor information) and reconstructing the sensor information in a way it may be used to generate an image, an object, or a virtual environment. In some aspects, the risk map generation system 302 may generate a risk map using risk objects, risk values, road segments, and/or other risk maps. In some embodiments, risk assessment system 302 may generate a risk map using road segments, risk objects, and risk maps received from other computing devices. In view of this disclosure, it will be understood that the risk map may be generated in various ways. After step 620, the method may proceed to step 625.

At step 625, the risk assessment system 302 may analyze vehicle information data, including sensor data and mobile device derived inputs to calculate one or more indexes, such as a tailgating risk index, a road frustration index, a lane keeping index, a driver attention index, an internal distraction index or other risk index, the risk map and calculate a risk value. In some aspects, the risk value may be represented by a risk score. In some embodiments, the risk assessment system 302 may calculate the risk value for a predicted driving activity by applying actuarial techniques to the sensor information that may be received from sensors 304 and mobile device 306 (such as rear-facing and forward facing camera, GPS, and accelerometer). In other examples, system 302 may calculate the risk value by applying actuarial techniques to the information that may be received by the risk map engine 318. In some embodiments, the risk assessment system 302 may calculate the risk value based on the likelihood of proposed activity causing the vehicle to get in an accident. In some aspects, the risk assessment system 302 may calculate the risk value using only road information. For example, the risk value may be calculated based on only the physical attributes of the road. In some embodiments, the risk assessment system 302 may calculate the risk value using only the sensor information. In some instances, risk assessment system 302 may analyze a risk to calculate a risk value as previously described with regards to FIG. 3.

After calculating a risk value at step 625, the risk assessment system 302 may associate the road segment a vehicle is traveling on or user activity to the risk value at step 630. In some aspects, associating the risk value may include analyzing the road segment or risk map the vehicle 308 is traveling along or through, identifying one or more risk objects and the characteristics of the one or more risk objects, and calculating a risk value based on the number of risk objects and the characteristics of the one or more risk objects located on the road segment or within the risk map. In some aspects, the risk assessment system 302 may have a list of pre-determined risk objects correlated to a predetermine risk value. In some aspects, the risk assessment system 302 may have different groupings of user risk activity (which may be categorized by the characteristics of the risk activity) correlated to predetermined values. In some embodiments, a user may be able to determine, categorize, or correlate a user risk activity to a user selected value. In some embodiments, a specially configured or programmed server or computing device of an insurance provider that manages the computing system may rank, prioritize, or correlate the user risk activity to a selected value. For example, a risk user activity speaking on a mobile phone may have a risk value of 10, while risk user activity of holding and texting with mobile phone while on the road may have a risk value of 20. In some aspects, the risk value assigned may represent the likelihood of a risk activity causing an accident. After step 630, the method may proceed to step 635.

At step 635, the risk assessment system 302 may assemble risk data into multivariable equations. For example, the risk assessment system 302 may use the data (identified at step 630) to determine a risk value of an object or a segment of road or user activity with mobile device based on predetermined equations, such as input from a tailgating risk index 1002, a road frustration index 1004, a lane keeping index 1006, a driver attention index 1008, an internal distraction index 1012 or other risk index. The equations may be configured for different information inputs which may affect the risk value assigned to a risk object, risk map, and/or road segment. For example, one equation may use sensor data while another equation may use the sensor data, environmental data, and geographic location data to determine a risk value. In some instances, a network device or insurance provider's server may generate and determine the multivariable equations. In some embodiments, the multivariable equations may be generated using actuarial techniques. Once the risk assessment system 302 assembles the received information into multivariable equations or machine learning module 320, the method may proceed to step 640.

At step 640, the risk assessment system 302 may calculate a modified risk value based on environmental information and/or other received information. For example, the risk assessment system 302 may use the determined risk values from step 625 and use the multivariable equation or machine learning module 320 from step 635 to use additional received data (e.g., geographic location information and/or environmental information) to calculate a modified risk value. As another example, a risk value determined at step 625 may be adjusted. Under this example, the risk assessment system 302 may adjust a risk value due to a new condition (e.g. snow on the road). Due to the snow, risk assessment system 302 may use the multivariable equation or machine learning module 320 to determine that the previous risk value needs to be modified. Upon completion of step 640, the method may proceed to step 645.

At step 645, the risk assessment system 302 may store the modified risk value in memory. In some aspects, the modified risk value may be correlated to mark or enhance a particular risk object, road segment, and/or risk map. The particular risk object, road segment, or risk map may be updated and assigned the new modified risk value. The updated risk object, road segment, or risk map with its updated risk value may be stored by the risk assessment system 302 into a database. In some aspects, the database information may be shared with other computing devices or be used to generate other risk maps with similar road segment characteristics. After step 645 is completed, the method may proceed to step 650.

At step 650, the risk assessment system 302 may determine if the risk value (e.g. risk score) is over a threshold. The threshold value may be determined by a user or a system provider (e.g., insurance company/provider). Also, the threshold value may be adjusted on a case-by-case basis (e.g., driver by driver basis), or may be predetermined. If the risk assessment system 302 determines that the risk value is not over the threshold, the method may proceed to step 605. If the risk assessment system 302 determines that the risk value has exceeded the threshold, then the method may proceed to step 655.

At step 655, the risk assessment system 302 may update the risk assessment based on the modified risk value. In some aspects, updating the risk assessment may comprise changing screen colors and/or audio indication. The indicators may function to help alert the driver of potential risks and/or disable certain features of the mobile device. In some examples, the indicator may result in enhancing a risk with a color, a sound, or an animation. In some instances, an indicator is similar to the indicator as described with reference to FIG. 3. After step 655 has completed, the method may proceed to step 660.

At step 660, the risk assessment system 302 may alert the user of a vehicle or provide recommended course of action to avoid the risky situation. The recommended course of action may be any previously described indicator by driver engagement engine 314 (with reference to FIG. 3). In some aspects, the recommended course of action may identify or indicate to the user of a vehicle that there is a potential risk and what that potential risk may be. In some examples, the risk assessment system 302 may display the risk object, road segment, and/or risk map to a user. In other examples, risk assessment system 302 may provide the user with an audio alert. In other examples, the mobile device 306 and software logic flash type program memory 714, for storage of various program routines and configuration settings and has APIs that interface with driving engagement engine 314 to engage or disable features of mobile device 306. Using risk matrix 800, if the risk assessment is conducted in driving mode cruising, then the mobile device 306 can allow answering the call. Still using risk matrix 800 shown in FIG. 8, if the risk assessment is conducted in driving mode maneuver, then the mobile device 306 would not allow searching, texting, answering incoming calls, for example, as the APIs would interact with the internal phone logic. After step 660 has completed, the method of FIG. 6 may be repeated so that another risk assessment may be generated or so that the risk assessment is continually and/or dynamically updated to as the vehicle moves.

While the above steps described an example method or operation in accordance with FIG. 6, steps may be added, omitted, or modified to the methods of the FIG. 6 without departing from the scope of the present disclosure.

FIG. 7 provides a block diagram illustration of an exemplary user device 700. Although the user device 700 may be a smart-phone, a tablet, or another type of device, the illustration shows the user 700 is in the form of a handset (although many components of the handset, such as a microphone and speaker, are not shown).

Referring to FIG. 7 for digital wireless communications, the user device 700 includes at least one digital transceiver (XCVR) 708 connected to an antenna 710 that receives data packets uploads and downloads using cell tower transmissions with from an Over-The-Air Transmitter. The transceiver 708 provides two-way wireless communication of information, such as digital information, in accordance with the technology of the network. The transceiver 708 also sends and receives a variety of signaling messages in support of the various services provided via the user device 700 and the communication network. The user device 700 also includes an NFC interface 709 having an associated antenna and configured for communicating using near-field communication with other devices such as with an NFC reader. The user device 700 includes a display 722 for displaying messages, menus or the like, user related information for the user, etc. A touch sensor 726 and keypad 730 enables the user to generate selection inputs, for example.

A microprocessor 712 serves as a programmable controller for the user device 700, in that it controls all operations of the user device 700 in accord with programming that it executes, for all normal operations, and for operations involved in the real-time parking guidance service. In the example, the user device 700 includes flash type program memory 714, for storage of various program routines and configuration settings. The user device 700 may also include a non-volatile random access memory (RAM) 716 for a working data processing memory. In a present implementation, the flash type program memory 714 stores any of a wide variety of applications, such as navigation application software and/or modules. The memories 714, 716 also store various data, such as input by the user. Programming stored in the flash type program memory 714 is loaded into and executed by the microprocessor 712 to configure the processor 712 to perform various desired functions, including functions involved in push notification processing. In some examples, the user device 700 further includes a GPS interface 711 coupled to a GPS antenna designed to receive GPS location signals transmitted by satellites. The GPS interface 711 is communicatively coupled to the microprocessor 712, and is operative to provide location information to the microprocessor based on the received location signals. Microphones and front-facing and rearing facing cameras (not shown in FIG. 7) may also be provided with user device 700.

Figure 9A:
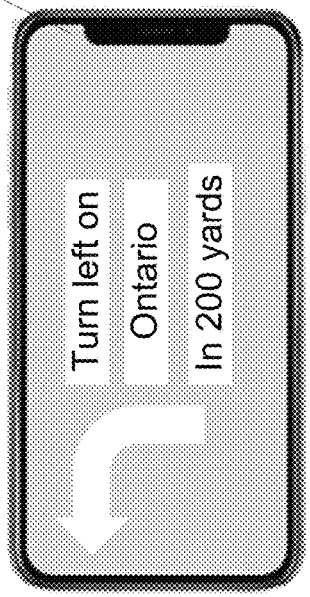
FIGS. 9A-9C depict illustrative user interfaces in accordance with aspects of the present disclosure.
Figure 9B:
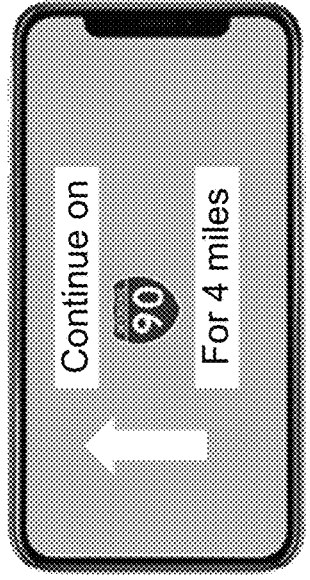
Figure 9C:
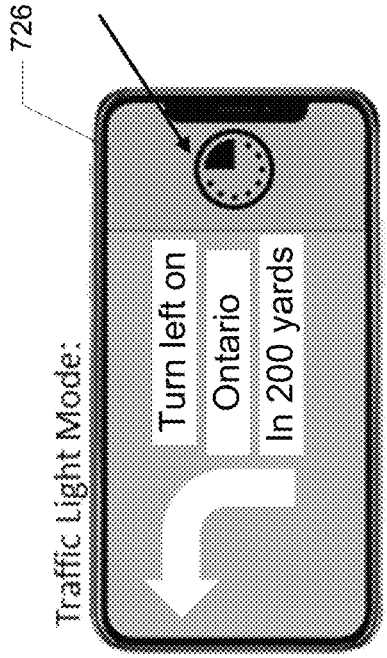
Figure 10:
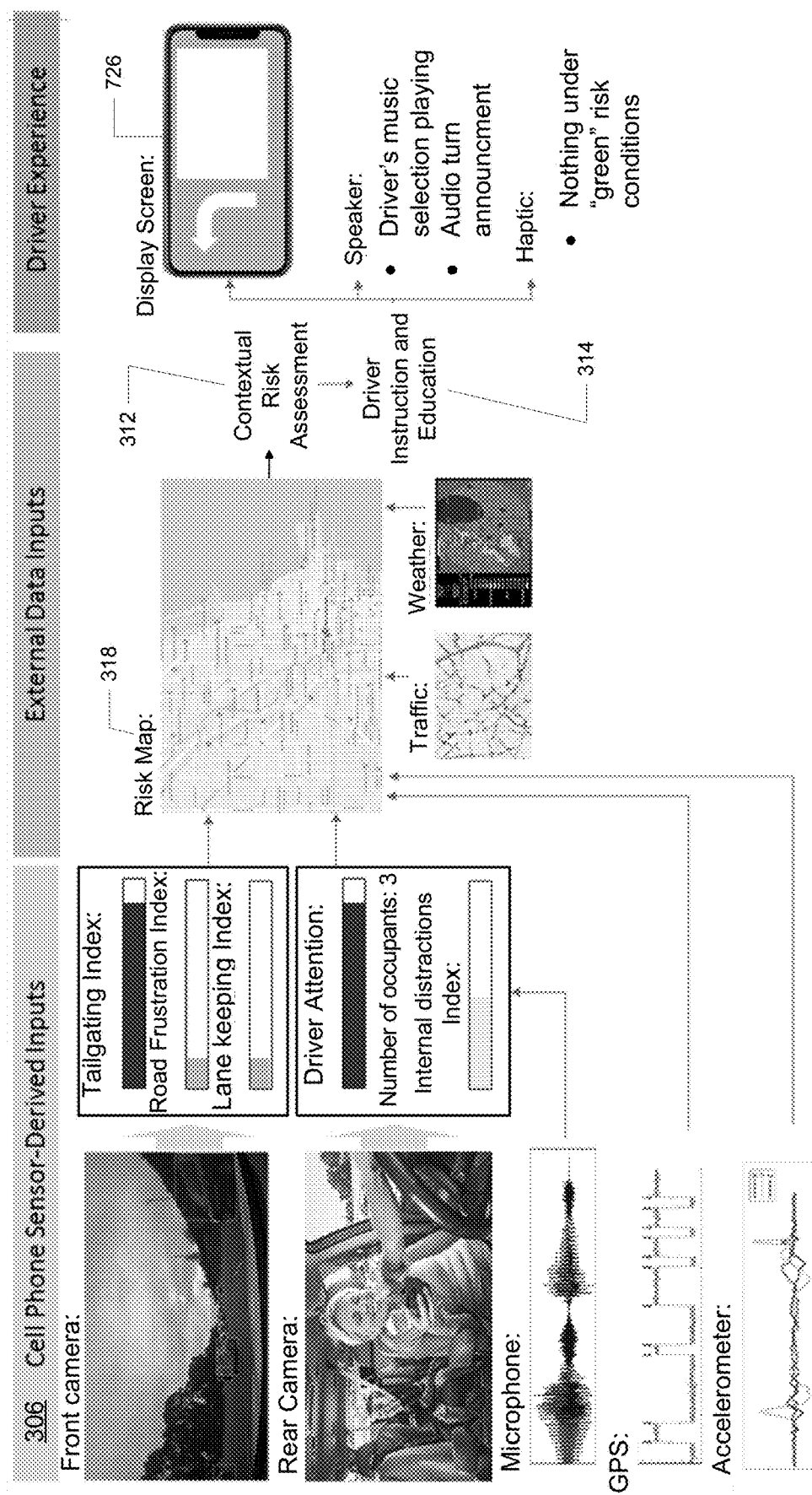
FIG. 10 depicts a functional block diagram of an example operation in accordance with aspects of the present disclosure.

FIGS. 9A-9C depicts illustrative user interfaces in accordance with various implementations of driver engagement engine 314. In FIG. 9A, the driving mode has a pending maneuver, such as a left turn on street "Ontario" in 200 yards. The display screen 722 may have color indication of a yellow color. Contextual risk assessment system 302 might not allow permitted mobile user activities during a maneuver window due to the increased risk assessment at the intersection. In FIG. 9B, the driving mode indication shows a safe cruising mode. During this mode, the screen display 726 may have a color indication of a green color. Contextual risk assessment system 302 may allow some permitted activities during safe cruising, such as music selection and control. In FIG. 9C, the mode indication shows a traffic light mode. During this mode, the display screen 722 may have a color indication of a green color. Contextual risk assessment system 302 may allow most permitted activities during this stopped situation and may, e.g., enable the user to select music, search and select destinations, search and select news headlines, initiate telephone call, and dictate and send text messages. The screen display may provide an indication of the estimate stop time.

In one user scenario, if a motorist drives in a car with others to a destination on the open highway in light traffic (e.g., road conditions), the system 302 may enable the motorist to be able to, at least, select music to play. In another case, on that same drive, the system 302 may determine whether the vehicle is currently in a safe operation mode to do a destination selection for a gas station up ahead or a place to eat up ahead on the road. The system 302 may enable those features where the risk assessment is low and safe.

Referring to FIG. 11, the tailgating index 1002 is scaled from high to low. In some implementations, the mobile device 306 and software logic flash type program memory 714, for storage of various program routines and configuration settings and has APIs that interface with driving engagement engine 314. In one operation, the front facing camera of mobile device 306 take a digital image 1100 of the scene in front of the vehicle 308. The closer the car in is vehicle 308, then the tailgating index 1002 is scaled high. If the car is not close in with predetermined distance from the vehicle 308, then the index 1002 goes lower. Still referring to FIG. 11, the road frustration index 1004 is scaled from high to low. In one operation, the front facing camera of mobile device 306 take a digital image 1100 of the scene in front of the vehicle 308. The number of vehicles on the road, such as rush hour traffic congestion can be used to calculate the index 1004. Machine learning module 320, while examining an image 1100 may look for edges which form motifs which form parts, which form the object being sought, such multiple cars the road in front of vehicle 308. The more cars detected in the image 1100, then the index 1004 can go higher in the scale. Likewise, if fewer cars are detected in the image 1100, then index 1004 scales lower. Lane keeping index 1006 indicates that number of events of sudden lateral movements of the vehicle 308 with the accelerometer of the mobile device 306. Machine learning module 320, while examining an image 1100, may look for edges which form motifs which form parts, which form the object being sought, such as side lanes of the road that the vehicle is traveling.

Referring to FIG. 12, the driver attention index 1008 is scaled on a sliding scale from alert at one end to distracted at another end. In some implementations, the mobile device 306, 700 may include software logic flash type program memory 71, for storage of various program routines and configuration settings and may have APIs that interface with driving engagement engine 314. In one operation, the rear facing camera of mobile device 306 may take a digital image 1200 of the scene in the interior cabin of the vehicle 308. Machine learning module 320, while examining an image 1200, can look for edges which form motifs which form parts and/or which form the object being sought, such as the interior of the vehicle 308 to find sudden movement of the occupants. Internal distractions index 1012 may be scaled from low to high. Microphone data of the mobile device 306 may be monitored to create index 1012. High pitch sounds and/or loud noises may determine an index value using formulaic or machine learning module 320. Referring to FIG. 13, the current contextual risk assessment 1300 is scaled from high to low.

Referring to FIG. 13, mobile device derived input data may be used to determine one or more contextual risk assessments 1300 from a range of mobile device 306, 700 derived inputs to calculate one or more indexes, such as a tailgating risk index 1002, a road frustration index 1004, a lane keeping index 1006, a driver attention index 1008, an internal distraction index 1012 or other risk index (see FIGS. 11-13) using one or more of multivariable equations of machine learning module 320 or other described herein.

In some implementations, the system 302 may automatically place the phone in "safe driving mode" if it is not inserted into a docking station to enable hands free operation. This operation may help ensure compliance/usage of that docking station for hands free operation of the mobile phone. In one implementation, the docking station may have a smart sensor to determine presence of phones in the station. The phone may then determine who is driving based on the rear-facing camera (selfie camera). The mobile device may connect to the vehicle 308 via, Wifi, Bluetooth, NFC, or other wireless method.

In some implementations, the system 300 may self-determines (using-machine learning module 320) when it is unable to adequately survey and assess surrounding conditions. When it is unable to survey and assess, the system may undertake one or more of several actions including, but not limited to: alerting the driver that the detection capabilities have been suspended; or automatically placing the phone into a "safe driving" mode (e.g., automatically limits "connected life" functions to a minimum). In other implementations, the same functionality may be activated if the phone's position is changed (e.g., gets dislodged such that it no longer is pointed correctly at the road or into the cabin), or somehow fails to function properly.

In one mode of operation, the phone (e.g., user device 700) may be placed into a docking station to activate a safe-driving mode. That is, the docking station may be able to detect whether the phone (e.g., user device 700) is in the car but is not in the docking station to activate the mode. In another mode of operation, the phone may be in the docking station and activated and working, but upon a change in conditions such that the phone cannot work normally, the docking station may activate a safe default mode. Then the system may provide performance and signal back to the user in the safe default mode.

Referring to FIG. 2, during operation of the vehicle 208, a user (e.g., driver, passenger, etc.) of the vehicle 208 may be located at the position depicted by identifier 202. Sensors 204 (e.g. 204a through 204h) may be located inside, outside, on the front, on the rear/back, on the top, on the bottom, and/or on each side of the vehicle 208. In some cases, the number of sensors 204 used and positioning of the sensors 204 may depend on the vehicle 208, so that sensor information for all areas surrounding the vehicle 208 may be collected. The sensors 204 (e.g. 204a through 204h) may lens or a camera system to read light data surrounding the vehicle.

In one implementation, a camera system with car sensors 204a-204h may be configured with depth perception (e.g., stereo vision) so that it may calculate different depths level in the field of view. One implementation of machine learning module 320 may include deep learning technology that may utilize convolutional neural network segments data using convolutional filters to locate and identify learned, observable features in the data in the field of view. In one mode of operation, the system with module 320 may calculate a perception of low light conditions, nighttime dark conditions (e.g., dark roads), excess light glare conditions (e.g., sun light glare) or partially observable environment (e.g., fog or snow) to determine whether the visual environment is degraded by one or more percent levels. Then at a predetermined threshold, the system may activate a safe default mode. In one example, a lens of the camera system might not have full view and, in a multi lens camera system, a predetermined threshold of percent degraded may result in alerting the driver and going into a safe default mode. In this way, using a visibility degradation level based on current situation, certain functions may be activated or deactivated for a safe default mode.

In some implementation, mobile computing device 306 with cameras (front-facing and/or rear-facing camera) may be configured with depth perception (e.g., stereo vision) so that it may calculate different depths level in the field of view. One implementation of machine learning module 320 may include deep learning technology that may utilize convolutional neural network segments data using convolutional filters to locate and identify learned, observable features in the data in the field of view of the cameras. In one mode of operation, the system with module 320 may calculate a perception of low light conditions, nighttime dark conditions (e.g., dark roads), excess light glare conditions (e.g., sun light glare) or partially observable environment (e.g., fog, heavy rain, or snow) to determine whether the visual environment is degraded by one or more percent levels. Then at a predetermined threshold level, the system 300 may activate a safe default mode. In one example, a lens of the camera system might not have a full view or may be obstructed, and, in a multi-lens camera system, a predetermined threshold of percent degradation may result in alerting the driver and entering into a safe default mode. In this way, using a visibility degradation level based on current situation, certain functions may be activated or deactivated for a safe default mode.

In some implementations, referring to FIGS. 3 and 8, driving mode connected activity risk matrix 800 may provide features that that can happen on a mobile device 306, 700 with driving tasks or tasks a user might perform on the mobile device for a safe driving window for the safe default mode, including predictive analysis with machine learning module 320 using cameras (front-facing and/or rear-facing camera). The "y-axis" or vertical axis may indicate a driving mode, while the "x-axis" or horizontal axis may indicate connected activity on the user's mobile device 306. One implementation of machine learning module 320 may include deep learning technology that may utilize convolutional neural network segments data using convolutional filters to locate and identify learned, observable features in the data so that during the driving mode, various connected activities could be enabled or disabled based on the current driving conditions or predicted driving conditions.

In one use case example, the system 300 with machine learning module 320 can be predictive about upcoming driving conditions using traffic data input and weather data input (see FIGS. 6 and 8). In some implementations, the risk assessment system 302 and machine learning module 320 may receive sensor information from mobile computing device 306, a network device, or other computing devices. The risk assessment system 302 and module 320 may receive geographic information (e.g., geographic location information) from a GPS device installed in a vehicle, mobile computing device 306, or another computing device. For example, the risk assessment system 302 may receive GPS coordinates from a mobile phone of a driver of a vehicle via a cellular backhaul. For example, the geographic location may comprise latitude and longitude coordinates of vehicle 308 or mobile computing device 306.

In one implementation, the system 300 has a risk map generation engine 318 which can predict roads or normal travel ahead of the vehicle 308. Based on the navigational GPS directions of vehicle 308 (with mobile device 306), the system 300, can predict the sun angle and sunrise timing in a particular geographic area. In one implementation, the system 300 can advise when to start the user's playlist or make a hands-free call before the roads conditions degrade using predictive analysis with machine learning module 320. Using risk matrix 800, if the risk assessment is conducted in driving mode cruising, then the mobile device 306 alert the user to answer a call. Still using risk matrix 800 shown in FIG. 8, if the risk assessment is for a predicted driving mode maneuver using module 320, then the mobile device 306 would not allow searching, texting, answering incoming calls, for example, as the APIs would interact with the internal phone logic. Hence, in one implementation, the system 300 may provide the user with the ability to accomplish what they need to accomplish before they enter into that particular situation for making a hands-free phone call or other task with the mobile device 306 (to safely execute in safe road conditions).

In some implementations, the system 300 may use the past history of the full usage (stored in computer readable medium/database) to learn and predict (using module 320) when the users might use the mobile device 306 during a driving operation. For example, a user might tend to have more calls at a certain time window during driving to the work or an office or other destination. By using risk matrix 800 shown in FIG. 8, if the risk assessment for a predicted driving mode maneuver using module 320 involves higher risk, then the mobile device 306 would not allow searching, texting, answering incoming calls. In another implementation, the system 300 could store the types history of the activations or applications of the during the same time of the day during the week. The system 300 can store day versus week and weekend and the time with the type of applications. If any of these activations can involve higher predictive risk, the system 300 could alert the user to modify their driving behaviors to reduce risk, such as would not allow searching, texting, answering incoming calls during a predictive higher risk driving operation.

In some implementations, the driver engagement engine 314 may determine how to provide an audio recommendation via the speaker of the mobile device 306, 700 or over the vehicle 308 audio emanating from the mobile device 306, 700. In some implementations, system 300 may have a natural language processor or keyword recognition software or machine learning module 320 to read text messages that would be highly relevant to the user. In one example, an SMS text message may include, in the header of the message or in the body of the text as a keyword as "urgent, call me". The system 300 could interpret that as part of the message and alert the user verbally with module 314 that "you have an urgent call, you want me to place the call?" The user can provide verbal commands without a need to touch the mobile device 306. However, by using risk matrix 800 shown in FIG. 8, if the risk assessment for a predicted driving mode maneuver using module 320 involves higher risk, then the mobile device 306 via drive engagement module 314 might not allow searching, texting, answering incoming calls or placing calls until the risk is at safer level for the driving operation. In this way, the system 300 may enable initiation of a mobile device action when the mobile device is in a safe driving environment, which would then protect the user and reduce risks of driving, while using the mobile device is in a hands-free operation.

In some implementations, the system 300 via machine learning module 320 may learn usage patterns such as how often a person accesses mobile device 306 so as to advise the user of safe driving behaviors. In one example, when the mobile device 306 is not in the docketing stations, an application may run in the background to log certain activities, such the frequency with which emails or texts messages are checked. The system 300 may provide a user a verbal alert such as "you have no new messages" in certain scenarios. In another implementation, the system may provide another verbal alert to the user, such as "when something comes through and the system will alert you." Such alerts may prevent frequent use of the mobile device 306 during driving conditions. In some implementations, predicted interactions with the mobile device 306 may be determined based on detected patterns of use, and, the mobile device 306 enable different operations at the appropriate frequency or sequence for safer driving based on such predicted interactions. In this implementation, the system 300, e.g., using risk matrix 800 shown in FIG. 8, may calculate the risk assessment for a predicted driving mode maneuver using machine learning module 320 and may then then enable certain phone operations based on the risk assessment.

In some implementations, the system 300 via machine learning module 320 could learn usage patterns, such as how often a person accesses with mobile device 306, so as to engage the user for safe driving behaviors and provide predictive job queues for various phone actions during the safe driving time. For example, based on the patterns the system 300 could initiate calls based on verbal commands. The user can prearrange in system 300 that they want to call their work place or person, or local business prior to the driving operation.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, where the described implementation includes software, it should be understood that a combination of hardware and software or hardware alone may be used in various other embodiments. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A system comprising:
a computing device in signal communication with one or more sensors coupled to a vehicle, the one or more sensors configured to detect sensor information, wherein the computing device comprises:
a processor; and
memory storing instructions that, when executed by the processor, cause the computing device to:
receive the sensor information detected by the one or more sensors;
communicate with a mobile device to receive mobile information;
generate a recommendation corresponding to one or more dynamic risk values, the one or more dynamic risk values are based on the sensor information and the mobile information, and the recommendation includes a risk map that presents an assessment of anticipated future risk in a predefined future amount of time; and
cause the recommendation including the risk map to be displayed at an interface of the mobile device.

2. The system of claim 1, wherein causing the recommendation to be displayed at the interface of the mobile device includes transmitting the recommendation to the mobile device and instructing the mobile device to display the recommendation.

3. The system of claim 1, wherein the risk map depicts an assessment of risk based on a traffic condition or a weather condition.

4. The system of claim 3, wherein the one or more dynamic risk values are based on at least one of a driver attention index or an internal distraction index.

5. The system of claim 1, wherein the predefined future amount of time is 30 seconds.

6. The system of claim 1, wherein the risk map includes a visual output representing a segment of road or route being traveled by the vehicle.

7. The system of claim 6, wherein the visual output includes a video representing the recommendation.

8. The system of claim 6, wherein the visual output includes a hologram representing the recommendation.

9. The system of claim 1, wherein the instructions, when executed by the processor, further cause the computing device to generate an update for the risk map responsive to the sensor information.

10. The system of claim 9, wherein the sensor information on which the update is based includes at least one of speed data indicating a speed of the vehicle or odometer data indicating a distance traveled by the vehicle.

11. The system of claim 1, wherein determining the one or more dynamic risk values associated with operation of the vehicle includes determining, based on the sensor information and the mobile information, at least one of:
 a tailgating risk index;
 a road frustration index based on a number of vehicles in front of the vehicle; or
 a lane keeping index.

12. A method comprising:
 collecting sensor information originating from one or more sensors associated with a vehicle;
 collecting mobile information originating from a mobile device associated with an occupant in the vehicle;
 generating a recommendation corresponding to one or more dynamic risk values, the one or more dynamic risk values are based on the sensor information and the mobile information, and the recommendation includes a risk map;
 causing the recommendation including the risk map to be displayed at an interface of the mobile device; and
 causing the mobile device to generate an update for the risk map responsive to the sensor information, the update is based on odometer data indicating a distance traveled by the vehicle.

13. The method of claim 12, wherein the recommendation causes one or more features of the mobile device to be enabled or disabled based on the one or more dynamic risk values.

14. The method of claim 13, further comprising detecting, based on the sensor information, a traffic intersection, wherein causing the one or more features to be disabled is based on detecting the traffic intersection.

15. The method of claim 14, wherein detecting the traffic intersection includes using the sensor information to determine a traffic light status.

16. The method of claim 15, further comprising:
 generating, based on detecting the traffic intersection, a countdown clock; and
 causing the one or more features to be disabled in response to expiration of the countdown clock.

17. A computer-readable storage device storing instructions that, when executed by one or more processors, performs steps including:
 receive sensor information associated with operation of a vehicle;
 receive, from a mobile device, mobile information associated with operation of the vehicle;
 generate a recommendation corresponding to one or more dynamic risk values associated with the operation of the vehicle based on the sensor information and the mobile information, the recommendation including a presentation of a safe route;
 transmit, using a wireless communication interface, the recommendation to the mobile device;
 cause the recommendation including the presentation of the safe route to be presented at a user interface of the mobile device; and
 cause a floor of the vehicle or a seat of the vehicle to vibrate to indicate the recommendation.

18. The computer-readable storage device of claim 17, wherein, causing the recommendation to be presented at the user interface also causes the mobile device to vibrate.

19. The computer-readable storage device of claim 17, wherein causing the floor of the vehicle or the seat of the vehicle to vibrate to indicate the recommendation is responsive to identifying that a risk is located at a front of the vehicle.

20. The computer-readable storage device of claim 17, wherein the instructions, when executed by the one or more processors, further performs steps including causing a back of the seat of the vehicle to vibrate to identify that a risk is located at a rear of the vehicle.

\* \* \* \* \*